US005152140A

United States Patent [19]

Hirata et al.

[11] Patent Number: 5,152,140

[45] Date of Patent: Oct. 6, 1992

[54] PRESSURE COMPENSATING VALVE SPOOL POSITIONED BY DIFFERENCE IN PRESSURE RECEIVING AREAS FOR LOAD AND INLET PRESSURES

[75] Inventors: Toichi Hirata, Ushiku; Hideaki Tanaka, Tsuchiura; Genroku Sugiyama, Ibaraki; Yusuke Kajita, Tsuchiura; Kazunori Nakamura, Ibaraki, all of Japan

[73] Assignee: Hitachi Construction Machinery Co., Ltd., Tokyo, Japan

[21] Appl. No.: 640,440

[22] PCT Filed: Oct. 11, 1990

[86] PCT No.: PCT/JP90/01310

§ 371 Date: Feb. 6, 1991

§ 102(e) Date: Feb. 6, 1991

[87] PCT Pub. No.: WO91/05958

PCT Pub. Date: May 2, 1991

[30] Foreign Application Priority Data

Oct. 11, 1989 [JP] Japan .............................. 1-263022

[51] Int. Cl.[5] .............................................. F16D 31/02

[52] U.S. Cl. ........................................ 60/450; 60/452; 60/469; 91/446; 137/516

[58] Field of Search .................... 91/446; 60/450, 452, 60/469; 137/596, 596.13

[56] References Cited

U.S. PATENT DOCUMENTS

| | | | |
|---|---|---|---|
| 3,777,773 | 12/1973 | Tolbert | 91/446 |
| 3,987,623 | 10/1976 | Biachetta | 60/452 |
| 4,617,854 | 10/1986 | Kropp . | |
| 4,688,600 | 8/1987 | Kreth et al. . | |
| 4,967,557 | 11/1990 | Izumi et al. | 60/452 |
| 5,025,625 | 6/1991 | Morikawa | 91/446 |

FOREIGN PATENT DOCUMENTS

| | | |
|---|---|---|
| 57-177406 | 1/1982 | Japan . |
| 58-13202 | 1/1983 | Japan . |
| 60-11706 | 1/1985 | Japan . |

*Primary Examiner*—Edward K. Look
*Assistant Examiner*—F. Daniel Lopez
*Attorney, Agent, or Firm*—Fay, Sharpe, Beall, Fagan, Minnich & McKee

[57] ABSTRACT

A hydraulic drive system has a hydraulic pump (1), an actuator (2), a flow control valve (5) disposed between the hydraulic pump and the actuator, a pressure compensating valve (8; 8A; 8B) having a valve spool (23; 23A; 23B) that controls the differential pressure (Pz−PLS) across the flow control valve, and a pump delivery rate control device (9) for controlling a flow rate of the hydraulic fluid delivered from the hydraulic pump dependent on a differential pressure (Pd−PLS) between a pump pressure and a load pressure of the actuator. The pressure compensating valve has a first control chamber (30; 30A) subjected to the load pressure (PLS) of the actuator such that the load pressure acts on a first pressure receiving section (28; 28A) of the valve spool to urge the valve spool in the valve-opening direction, a second control chamber (29; 29A) subjected to the inlet pressure (Pz) of the flow control valve such that the inlet pressure acts on a second pressure receiving section (27; 27A) of the valve spool to urge the valve spool in the valve-closing direction, and a target differential pressure setting arrangement (31, 50, 51; 31B, 51) for urging the valve spool in the valve-opening direction. A damping capability to the actuator (2) is provided by setting pressure receiving area (Az) of the second pressure receiving section (27; 27A) to be greater than a pressure receiving area (ALS) of the first pressure receiving section (28; 28A).

6 Claims, 5 Drawing Sheets

PRESSURE COMPENSATING VALVE SPOOL POSITIONED BY DIFFERENCE IN PRESSURE RECEIVING AREAS FOR LOAD AND INLET PRESSURES

TECHNICAL FIELD

The present invention relates to a hydraulic drive system for civil engineering and construction machines such as hydraulic excavators, and more particularly to a hydraulic drive system for civil engineering and construction machines which include a pressure compensating valve to control the differential pressure across a flow control valve for controlling operation of an actuator.

BACKGROUND ART

There is known a hydraulic drive system for use in civil engineering and construction machines such as hydraulic excavators, typically called a load sensing system, wherein the delivery flow rate of a hydraulic pump, i.e., the pump delivery rate, is controlled so as to hold the delivery pressure of the hydraulic pump, i.e., the pump pressure, higher by a fixed value than the load pressure of an actuator, thus causing the hydraulic pump to deliver a hydraulic fluid only at the flow rate necessary for operation of the actuator. As disclosed in JP, A, 60-11706, for example, the load sensing system includes a pump regulator for load sensing control (LS control), which comprises an actuator cylinder for controlling the displacement volume of the hydraulic pump, and a control valve operated responsive to the differential pressure between the pump pressure and the load pressure for controlling operation of the actuator cylinder. The control valve is provided with a spring for urging the control valve in a direction opposite to the differential pressure between the pump pressure and the load pressure. The control valve is operated so as to keep the force of the spring in balance with the differential pressure between the pump pressure and the load pressure. The pump delivery rate is thereby controlled such that the above differential pressure is held at a fixed value corresponding to the spring force, i.e., a target differential pressure.

Furthermore, the load sensing system generally has a pressure compensating valve disposed upstream of a flow control valve to control the differential pressure across the flow control valve, thereby ensuring a flow control function to cope with fluctuations in the differential pressure between the pump pressure and the load pressure.

The pressure compensating valve generally comprises a valve spool slidably disposed in a valve housing and having a flow control section which serves as a variable restrictor, and first and second control chambers formed in the valve housing in facing relation to each other and accommodating the opposite ends of the valve spool respectively. The load pressure of the actuator (the outlet pressure of the flow control valve) is introduced to the first control chamber for urging the valve spool in the valve-opening direction, and the inlet pressure of the flow control valve is introduced to the second control chamber for urging the valve spool in the valve-closing direction. A spring for urging the valve spool in the valve-opening direction is disposed in the first control chamber to provide a target value for the pressure compensation.

When the differential pressure between the inlet pressure of the flow control valve and the load pressure of the actuator respectively introduced to the first and second control chambers, i.e., the differential pressure across the flow control valve, becomes larger than the setting value of the spring, the valve spool is caused to move in the valve-closing direction so that the differential pressure across the flow control valve is controlled to be held at the setting value of the spring, i.e., the target pressure. As a result of the differential pressure across the flow control valve being controlled in this way, the flow rate of hydraulic fluid passing through the flow control valve, i.e., the flow rate of hydraulic fluid supplied to the actuator, is adjusted to a value proportional to the opening area of the flow control valve, thus permitting stable control of the actuator.

One pressure compensating valve of this type is disclosed in U.S. Pat. No. 4,688,600, for example.

However, the hydraulic drive system equipped with the above-mentioned conventional pressure compensating valve has accompanying problem as follows.

In the case where the civil engineering and construction machine is a hydraulic excavator and the actuator is a boom cylinder for driving a boom as one component of a front mechanism, for example, when the flow control valve is quickly operated to change a drive speed of the boom cylinder during operation of the boom cylinder, the hydraulic fluid being subjected to inertia of the boom serves as a spring and produces a vibration. Once produced, the vibration will not damp or cease soon because the damping capability of the actuator is very poor in a hydraulic system constituted by the conventional hydraulic drive system. Therefore, control accuracy of the boom cylinder is lowered, which tends to a difficulty in realizing the operation as intended by an operator.

An object of the present invention is to provide a hydraulic drive system for civil engineering and construction machines and a pressure compensating valve for use in the system, in which the pressure compensating valve is improved to enhance the damping capability of an actuator and increase the control accuracy of the actuator.

DISCLOSURE OF THE INVENTION

To achieve the above object, the present invention provides a hydraulic drive system for a civil engineering and construction machine comprising a hydraulic pump, an actuator driven by a hydraulic fluid delivered from said hydraulic pump, a flow control valve disposed between said hydraulic pump and said actuator, a pressure compensating valve having a valve spool for controlling a differential pressure across said flow control valve, and pump delivery rate control means for controlling a flow rate of the hydraulic fluid delivered from said hydraulic pump dependent on a differential pressure between a pump pressure and a load pressure of said actuator, said pressure compensating valve including a first control chamber subjected to the load pressure of said actuator for making the load pressure act on a first pressure receiving section of said valve spool to urge said valve spool in the valve-opening direction, a second control chamber subjected to the inlet pressure of said flow control valve for making the inlet pressure act on a second pressure receiving section of said valve spool to urge said valve spool in the valve-closing direction, and target differential pressure setting means for urging said valve spool in the valve-opening direction for setting a target value of the differential pressure across said flow control valve, wherein a pressure receiving area of said second pressure receiving section is set to be greater than a pressure receiving area of said first pressure receiving section.

The present invention also provides a pressure compensating valve for controlling a differential pressure across a flow control valve disposed between a hydraulic pump and an actuator, the pressure compensating valve comprising a valve housing having an inlet recess connected to said hydraulic pump, an outlet recess connected to said flow control valve and a spool bore, a valve spool slidably fitted in said spool bore to control fluid communication between said inlet recess and said outlet recess, a first control chamber formed in said valve housing and subjected to a load pressure of said actuator, a first pressure receiving section disposed in said first control chamber to urge said valve spool in the valve-opening direction, a second control chamber formed in said valve spool and subjected to an inlet pressure of said flow control valve, a second pressure receiving section disposed in said second control chamber to urge said valve spool in the valve-closing direction, and target differential pressure setting means for urging said valve spool in the valve-opening direction for setting a target value of the differential pressure across said flow control valve, wherein a pressure receiving area of said second pressure receiving section is set to be greater than a pressure receiving area of said first pressure receiving section.

With the present invention thus constituted, the differential pressure across the flow control valve is given by a value resulted by subtracting a value containing the difference between the first and second pressure receiving areas as well as the load pressure from a value containing the spring force, the last value being only used in the prior art. This allows the flow rate of hydraulic fluid passing through the flow control valve, which is a function of the differential pressure across the flow control valve, to be expressed by a function of the value resulting from subtracting the value containing the difference in pressure receiving area and the load pressure from the value containing the spring force, i.e., a function which has a negative sign in the term containing the load pressure. Consequently, the relationship of $\{dQi(P)/dP\}<0$ is met and the actuator can have a superior damping capability. Details of this feature will be apparent from the description of the preferred embodiments below.

BEST MODE FOR CARRYING OUT THE INVENTION

Hereinafter, several preferred embodiments of the present invention will be described with reference to the drawings.

First Embodiment

At the outset, a first embodiment of the present invention will be described with reference to FIG. 1.

Figure 1:
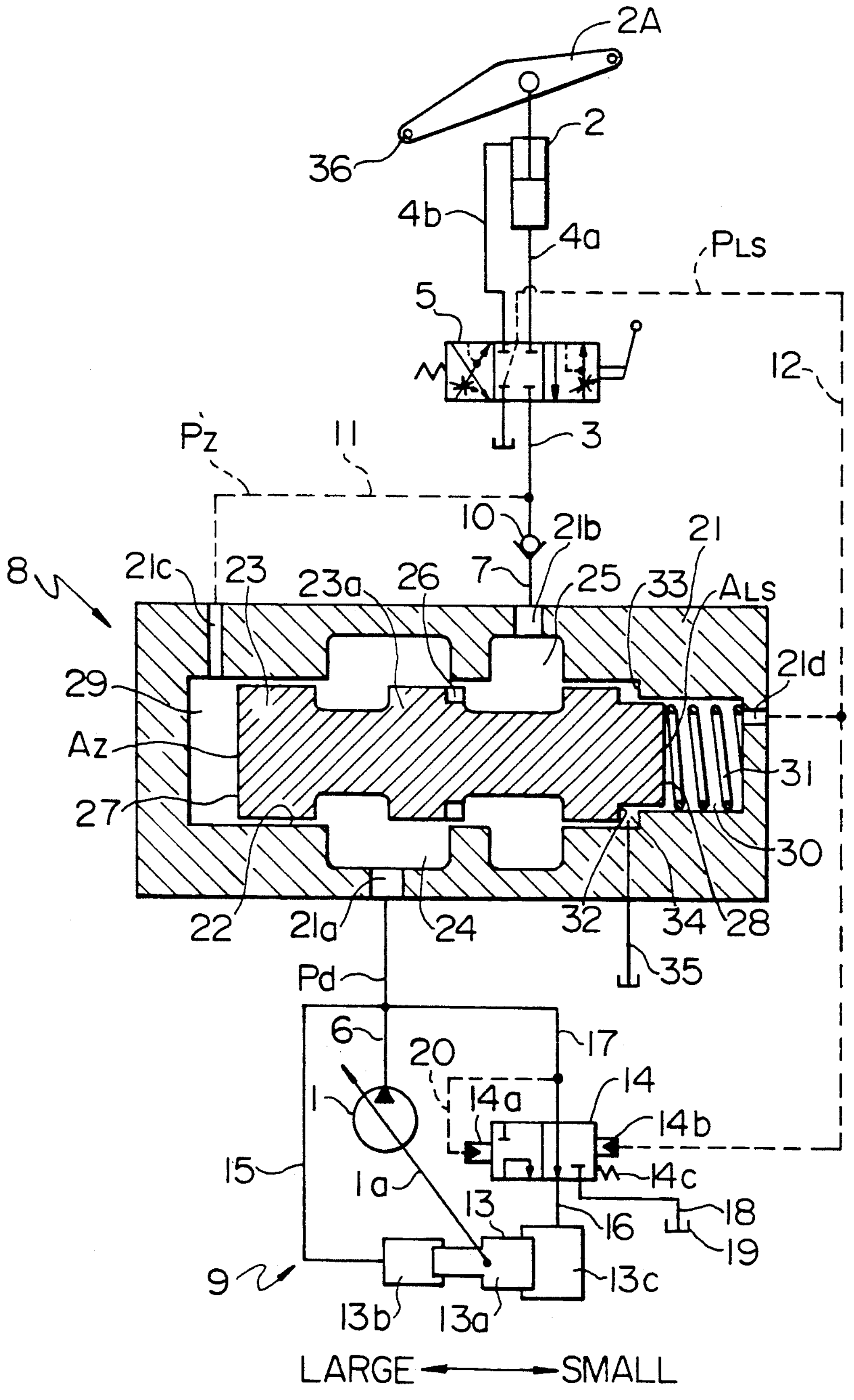
FIG. 1 is a schematic view of a hydraulic drive system according to a first embodiment of the present invention.

In FIG. 1, a hydraulic drive system of this embodiment comprises a hydraulic pump 1 of variable displacement type, an actuator driven by a hydraulic fluid delivered from the hydraulic pump 1, e.g., a boom cylinder 2 for driving a boom 2A of a hydraulic excavator, a flow control valve 5 disposed in lines 3, 4*a*, 4*b* between the hydraulic pump 1 and the boom cylinder 2 for controlling operation of the boom cylinder 2, a pressure compensating valve 8 disposed in lines upstream of the flow control valve 5, i.e., in a delivery line 6 of the hydraulic pump 1 and a line 7, for controlling the differential pressure Pz−PLS across the flow control valve 5, and a pump regulator 9 for controlling the delivery flow rate of the hydraulic pump 1, i.e., the pump delivery rate, dependent on the differential pressure Pd−PLS between the pump pressure Pd and the load pressure PLS of the boom cylinder 2. A check valve 10 for preventing a reverse flow of the hydraulic fluid from the boom cylinder 2 is disposed in the lines 3, 7 between the flow control valve 5 and the pressure compensating valve 8. The inlet pressure Pz of the flow control valve 5 is taken out through a line 11 connected to the line 3, and the outlet pressure of the flow control valve 5, i.e., the load pressure PLS of the boom cylinder 2, is detected through a load line 12 connected to the flow control valve 5.

The pump regulator 9 includes an actuator 13 coupled to a swash plate 1*a* of the hydraulic pump 1 for controlling the displacement volume of the hydraulic pump 1, and a control valve 14 operated responsive to the differential pressure Pd−PLS between the pump pressure Pd and the load pressure PLS for controlling operation of the actuator 13. The actuator 13 is constituted by a double-acting cylinder which comprises a piston 13*a* with its opposite end faces having the pressure receiving or bearing areas different from each other, and a smaller-diameter cylinder chamber 13*b* and a larger-diameter cylinder chamber 13*c* located to accommodate the opposite end faces of the piston 13*a*, respectively. The smaller-diameter cylinder chamber 13*b* is communicated with the delivery line 6 of the hydraulic pump 1 via a line 15, while the larger-diameter cylinder chamber 13*c* is selectively connected to the delivery line 6 via a line 16, the control valve 14 and a line 17, or to a reservoir 19 via the line 16, the control valve 14 and a line 18. The control valve 14 is structured such that it has two drive parts 14*a*, 14*b* located in opposite relation, one 14*a* of which is subjected to the pump pressure Ps via a line 20 and the line 17 and the other 14*b* of which is subjected to the load pressure PLS via the load line 12. Further, a spring 14*c* is disposed in the control valve 14 on the same side as the drive part 14*b*.

When the load pressure PLS detected through the load line 12 rises, the control valve 14 is driven leftwardly on the drawing to take an illustrated position, so that the larger-diameter cylinder chamber 13*c* of the actuator 13 is communicated with the delivery line 6.

Due to the difference in pressure receiving area between the opposite end faces of the piston 13_a_, the piston 13_a_ is forced to move leftwardly on the drawing, thereby to increase the tilting amount of the swash plate 1_a_, i.e., the displacement volume of the hydraulic pump 1. As a result, the pump delivery rate is increased to raise the pump pressure Pd. Upon a rise in the pump pressure Pd, the control valve 14 is returned rightwardly on the drawing and then stopped when the differential pressure Pd−PLS reaches a target value determined by the spring 14_c_. At the same time, the pump delivery rate becomes constant. Conversely, when the load pressure PLS lowers, the control valve 14 is driven rightwardly on the drawing so that the larger-diameter cylinder chamber 13_c_ is communicated with the reservoir 19. The piston 13_a_ is thereby forced to move rightwardly on the drawing to reduce the tilting amount of the swash plate 1_a_. As a result, the pump delivery rate is reduced to lower the pump pressure Pd. Upon a decrease in the pump pressure Pd, the control valve 14 is returned leftwardly on the drawing and then stopped when the differential pressure Pd−PLS reaches the target value determined by the spring 14_c_. At the same time, the pump delivery rate becomes constant. Thus, the pump delivery rate is controlled such that the differential pressure Pd−PLS is held at the target differential pressure determined by the spring 14_c_.

The pressure compensating valve 8 comprises a valve housing 21 which has an inlet port 21_a_, an outlet port 21_b_ and two control ports 21_c_, 21_d_ and also defines a spool bore 22 therein, and a valve spool 23 fitted in the spool bore 22 slidably in the axial direction. The valve housing 21 is also formed with annular inlet and outlet recesses 24, 25 to which the inlet and outlet ports 21_a_, 21_b_ are opened, respectively, whereas the valve spool 23 is formed in its flow control section 23_a_ with a plurality of notches 26 which collectively constitute a variable restrictor between the inlet recess 24 and the output recess 25.

Further, the valve housing 21 defines therein two control chambers 29, 30 in which the opposite ends of the valve spool 23 are positioned, respectively, and the hydraulic pressures in the control chambers 29, 30 act on pressure receiving sections 27, 28 formed by the opposite ends of the valve spool 23 for urging the valve spool 23 in the valve-closing direction and the valve-opening direction, respectively. In addition, a spring 31 is disposed in the control chamber 30. The spring 31 urges the valve spool 23 in the valve-opening direction for setting the target value of the differential pressure across the flow control valve 5 (i.e., the target value of the compensated differential pressure).

The inlet port 21_a_ is connected to the delivery line 6, the outlet port 21_b_ is connected to the line 7, the control port 21_c_ is connected to the line 11, and the control port 21_d_ is connected to the load line 12.

Moreover, in the pressure compensating valve 8 of this embodiment, a stepped portion 32 is formed adjacent to the end of the valve spool 23 on the same side as the pressure receiving section 28, and a stepped portion 33 is correspondingly formed in the valve housing 21 in facing relation, so that assuming that the pressure receiving area of the pressure receiving section 27 is Az and the pressure receiving area of the pressure receiving section 28 is ALS, the pressure receiving area Az is made smaller than the pressure receiving area ALS. Therefore, the relationship of $Az-ALS=\Delta A>0$ holds. Then, a chamber 34 defined between the two stepped portions 32 and 33 is connected to a drain circuit 35 in communication with the reservoir so that no pressure will act on the chamber 34.

In the hydraulic drive system thus constituted, when the flow control valve 5 is at a neutral position, the valve spool 23 is moved leftwardly on the drawing by the action of the spring 31 so that the pressure compensating valve 8 is fully opened. At this time, the swash plate 1_a_ of the hydraulic pump 1 is held at a minimum tilting position by the pump regulator 9.

Under such a condition, when the flow control valve 5 is operated in the valve-opening direction from the neutral position, the hydraulic fluid delivered form the hydraulic pump 1 is supplied to the boom cylinder 2 through the pressure compensating valve 8 and the flow control valve 5, whereupon the pump regulator 9 is operated to increase the pump delivery rate, as mentioned above, so that the boom cylinder 2 is extended or contracted to lift or lower the boom 2A about a fulcrum 36. On this occasion, the inlet pressure Pz of the flow control valve 5 and the load pressure PLS of the boom cylinder 2 are introduced to the control chambers 29, 30 of the pressure compensating valve 8 via the lines 11, 12, respectively. Thus, the valve spool 23 is subjected to the inlet pressure Pz of the flow control valve 5 introduced to the control chamber 29 in the valve-closing direction, and the load pressure PLS introduced to the control chamber 30 in the valve-opening direction. Therefore, when the differential pressure between the inlet pressure Pz of the flow control valve 5 and the load pressure PLS of the boom cylinder 2, i.e., the differential pressure Pz−PLS across the flow control valve 5, becomes larger than the resilient force of the spring 31, the valve spool 23 is moved in the valve-closing direction to control the differential pressure across the flow control valve 5 so that it is held at the setting value of the spring 31, i.e., the target value. As a result of that the differential pressure across the flow control valve 5 is controlled in this way, if the opening area of the flow control valve 5 remains fixed, the flow rate of hydraulic fluid passing through the flow control valve 5, i.e., the flow rate of hydraulic fluid supplied to the boom cylinder 2, becomes almost constant, making it possible to perform stable control of the boom cylinder 2.

The foregoing is related to the general operation of the hydraulic drive system including the pressure compensating valve 8. The operation specific to the pressure compensating valve 8 of this embodiment will be explained below.

Figure 2:
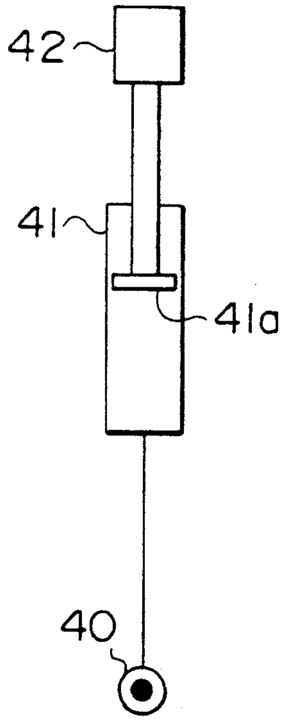
FIG. 2 PRIOR ART
FIG. 2 is a view for explaining how vibration is produced in a hydraulic cylinder conventionally in a well-known manner.

The damping characteristics of a typical cylinder system is considered in which, as shown in FIG. 2, has a hydraulic fluid is supplied from a hydraulic source 40 to a hydraulic cylinder 41 for driving a load 42. In FIG. 2, assuming that;

mass of the load 42: m
displacement due to operation of the hydraulic cylinder 41: x
operating speed of the hydraulic cylinder 41: $\dot{x}$
acceleration of the hydraulic cylinder 41: $\ddot{x}$
acceleration of gravity: g
pressure in a bottom chamber of the hydraulic cylinder 41: P
change rate of the pressure P: $\dot{P}$
flow rate supplied to the hydraulic cylinder 41: Qi(P)
pressure receiving area of a piston 41_a_ of the hydraulic cylinder 41: A volume of the bottom chamber of the hydraulic cylinder 41: V volume modulus of the hydraulic fluid led to the bottom chamber of the hydraulic cylinder 41: K the following equations hold:

$$m\ddot{x}=AP-mg \quad (1)$$

$$(V/k)\dot{P}=Qi(P)-A\dot{x} \quad (2)$$

Elimination of ẋ, ẍ from the equations (1), (2) leads to:

$$\ddot{P}-(k/V)\{dQi(P)/dP\}\dot{P}+(A^2k/mV)P=(Ak/V)g \quad (3)$$

From the well-known theory, the equation (3) indicates that the hydraulic system is an oscillating one, if;

$$\{dQi(P)/dP\}>0 \quad (4)$$

and that it is a damping one, if:

$$\{dQi(P)/dP\}>0 \quad (5)$$

Figure 3:
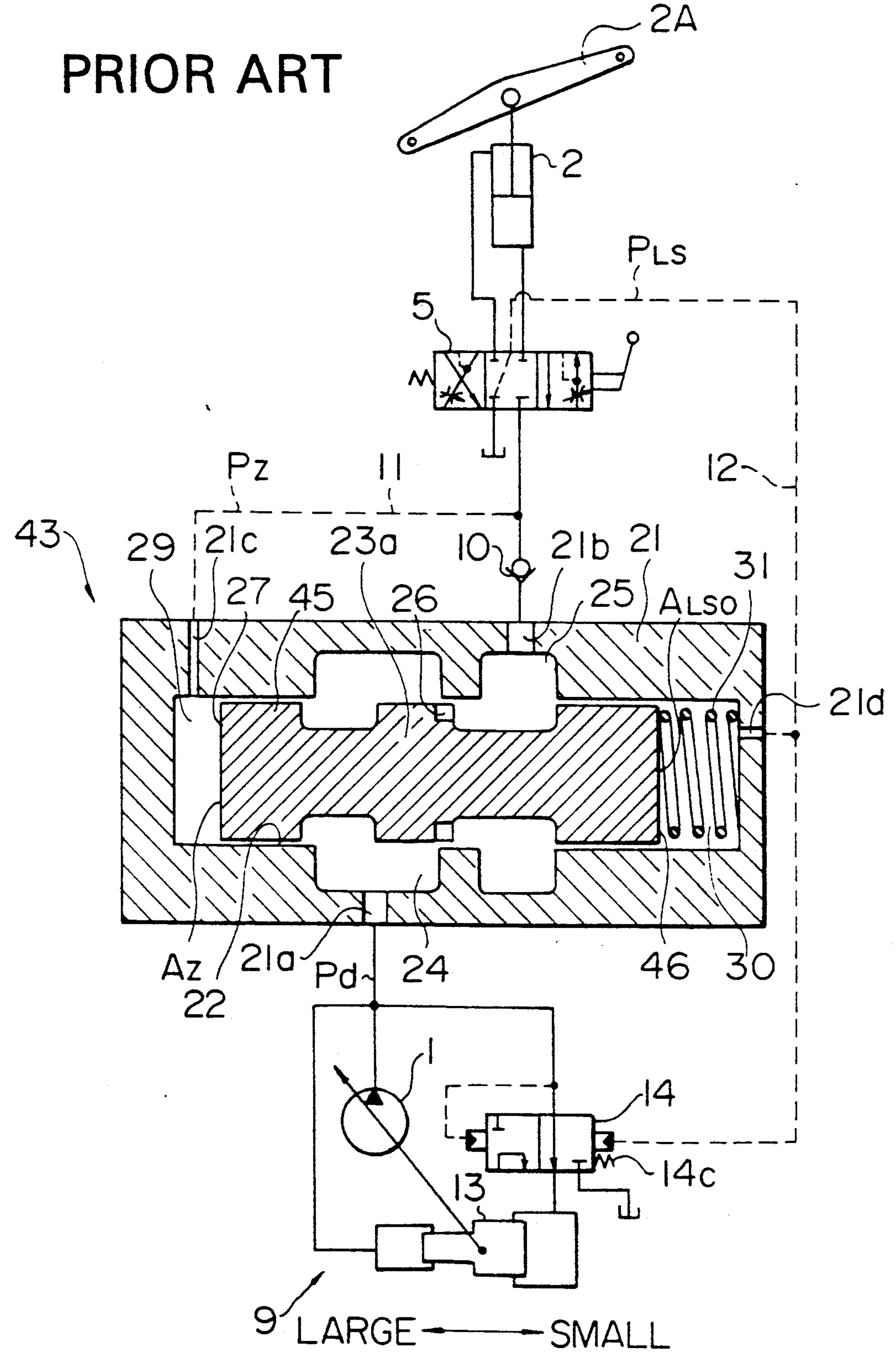
FIG. 3 PRIOR ART
FIG. 3 is a schematic view of a conventional hydraulic drive system.

Based on the foregoing background, now consider the hydraulic drive system equipped with a conventional pressure compensating valve shown in FIG. 3. In a conventional pressure compensating valve 43, a valve spool 45 is formed at the opposite ends thereof with pressure receiving sections 27, 46 of the same pressure receiving area. Thus, assuming that the pressure receiving area of the pressure receiving section 27 is Az and the pressure receiving area of the pressure receiving section 46 is ALSO, the relationship of Az=ALSO holds. In such an arrangement, given the resilient force of the spring 31, i.e., the initial load, being f, the differential pressure across the flow control valve 5 is controlled so as to meet the relationship of Az(Pz−PLS)=f. Accordingly, if the opening area of the flow control valve 5 remains fixed, the flow rate Qi(P) of hydraulic fluid passing through the flow control valve 5, which is a function of the differential pressure across it, becomes constant and is expressed by:

$$\{dQi(P)/dP\}=0 \quad (6)$$

This equation (6) indicates that once produced, the vibration will not be damped, but will last as a free vibration. Actually, the damping coefficient inside the boom cylinder 2 is small and the damping capability is very poor.

Stated otherwise, when the flow control valve 5 is quickly operated during operation of the boom cylinder 2, a vibration is produced in the boom cylinder 2, which lowers the control accuracy of the boom cylinder because of the very poor damping capability. This tends to create a difficulty in realizing the operation as intended by an operator.

In contrast, with this embodiment, assuming that the pressure receiving areas of the pressure receiving sections 27, 28 of the valve spool 23 are respectively Az, ALS, and the resilient force of the spring 31 is f, as mentioned above, the following equation holds from a balance of the respective forces acting on the valve spool 23D:

$$Az\ Pz=ALS\ PLS+f \quad (7)$$

Taking into account Az−ALS=ΔA, the equation (7) can be rewritten to:

$$Pz-PLS=(f/Az)-(\Delta A/Az)PLS \quad (8)$$

Accordingly, letting the opening area of the flow control valve 5 be a and letting c be a constant, the flow rate of hydraulic fluid supplied to the boom cylinder 2 is expressed by:

$$\begin{aligned} Qi(PLS) &= c\cdot a\sqrt{Pz-PLS} \\ &= c\cdot a\sqrt{(f/Az)-(\Delta A/Az)PLS} \end{aligned} \quad (9)$$

Differentiation of the equation (9) leads to:

$$dQi(PLS)/dPLS=\frac{-c\cdot a(\Delta A/Az)}{2\sqrt{(f/Az)-(\Delta A/Az)PLS}} \quad (10)$$

Since the term ΔA in the right side of the equation (10) is given by ΔA>0, the relationship of {dQi(P)/dP}<0 results to provide a damping capability as mentioned above.

Consequently, this embodiment can realize the relationship of {dQi(P)/dP}<0 shown in the above equation (5) so that the boom cylinder 2 has a damping capability. It is therefore possible to obtain high control accuracy of the boom cylinder 2 and achieve a superior following characteristic to operation of the boom cylinder 2 as intended by the operator.

Second Embodiment

A second embodiment of the present invention will be described with reference to FIG. 4. In this embodiment, the means for setting a target value of the compensated differential pressure is constituted by hydraulic means in place of the spring.

Figure 4:
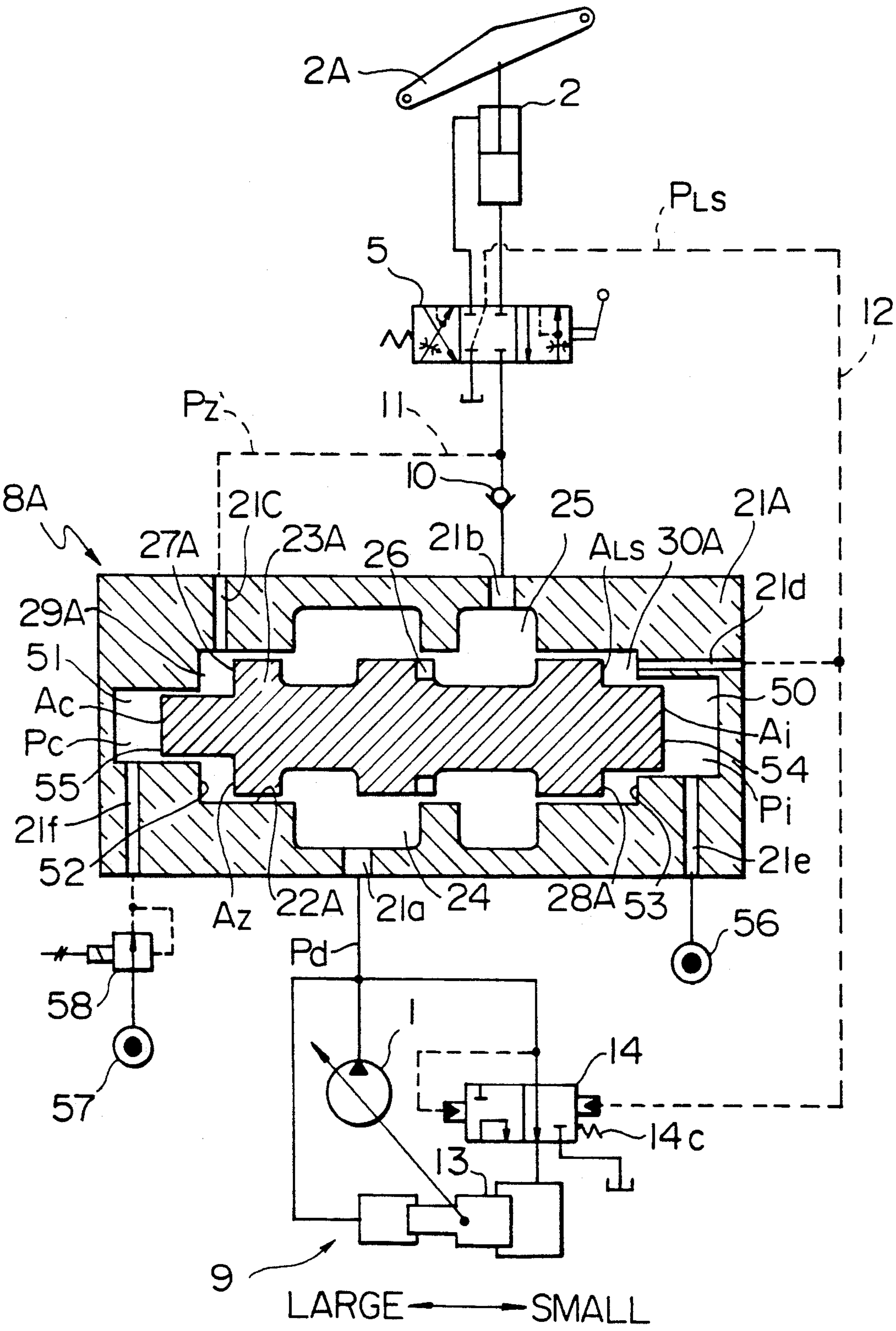
FIG. 4 is a schematic view of a hydraulic drive system according to a second embodiment of the present invention.

In FIG. 4, a pressure compensating valve 8A of this embodiment comprises a valve housing 21A which has two control ports **21*e*, 21*f*, in addition to an inlet port 21*a*, an outlet port 21*b* and two control ports 21*c*, 21*d*. In the valve housing 21A, there are defined a spool bore 22A, annular inlet and outlet recesses 24, 25, and four control chambers 29A, 30A, 50, 51. A valve spool 23A formed with a plurality of notches 26 is fitted in the spool bore 21A** slidably in the axial direction.

Stepped portions are formed adjacent to the opposite ends of the valve spool 23A to provide annular pressure receiving sections 27A, 28A, respectively, and stepped portions 52, 53 are correspondingly formed in the valve housing 21A in facing relation. The control chambers 29A, 30A are thus defined between respective pairs of the stepped portions. Introduced to the control chambers 29A, 30A are the inlet pressure Pz of the flow control valve 5 and the load pressure PLS of the boom cylinder 2 via the control ports **21*c*, 21*d*, respectively. Assuming that the pressure receiving area of the pressure receiving section 27A is Az and the pressure receiving area of the pressure receiving section 28A** is ALS, the relationship between these pressure receiving areas is expressed by Az−ALS=ΔA>0, as with the first embodiment.

Pressure receiving sections 54, 55 are formed at the opposite ends of the valve spool 23A and positioned in the control chambers 50, 51, respectively. The control chamber 50 is communicated with a hydraulic source 56 via the control ports **21*e*, while the control chamber 51 is communicated via the control port 21*f* with a solenoid proportional valve 58 in turn connected to a hydraulic source 57**.

The hydraulic sources 56, 57 each produce a constant pilot pressure Pi. The solenoid proportional valve 58 reduces the constant pilot pressure from the hydraulic source 57 in response to an electric signal applied thereto, for generating a control pressure Pc dependent on the electric signal. The control force produced in the control chamber 50 with the pilot pressure Pi from the hydraulic source 56 urges the valve spool 23A in the valve-opening direction, while the control force produced in the control chamber 51 with the control pressure Pc from the solenoid proportional valve 58 urges the valve spool 23A in the valve-closing direction. The resulting difference between both the control forces urges the valve spool 23A in the valve-opening direction to provide a target value of the compensated differential pressure similarly to the way spring 31 provides the target value in the first embodiment. Thus, the difference between both the control forces corresponds to the resilient force f of the spring 31. By controlling the solenoid proportional valve 58 to adjust the control pressure Pc, it is also possible to control the difference between both the control forces for optionally changing the target value of the compensated differential pressure.

In addition, the invention of EP, A1, 326,150 (corresponding to JP, A, 1-312202), for example, can be applied to control the above solenoid proportional valve. With such an application, when a hydraulic pump is saturated in a hydraulic drive system for driving a plurality of actuators, respective target values of the compensated differential pressure across a plurality of pressure compensating valves can properly be modified to carry out adequate flow control such as distribution control for supplying a hydraulic fluid to respective actuators reliably.

In the second embodiment thus constituted, the following equation holds from a balance of the respective forces acting on the valve spool 23A:

$$Az\ Pz + Ac\ Pc = ALS\ PLS + Ai\ Pi \quad (11)$$

This equation (11) can be rewritten to:

$$Az\ Pz = ALS\ PLS + (Ai\ Pi - Ac\ Pc) \quad (12)$$

Here, the term AiPi−AcPc corresponds to the resilient force *f* of the spring 31 in the first embodiment. Therefore, the equation (12) is equivalent to the equation (7) mentioned above. As a result, the second embodiment also meets the relationship of $\{dQ(P)/dP\}<0$ and can provide the similar advantageous effect to that in the foregoing first embodiment.

Third Embodiment

A third embodiment of the present invention will be described with reference to FIG. 5. In this embodiment, the target value of the compensated differential pressure is set by a combination of a spring and hydraulic means.

Figure 5:
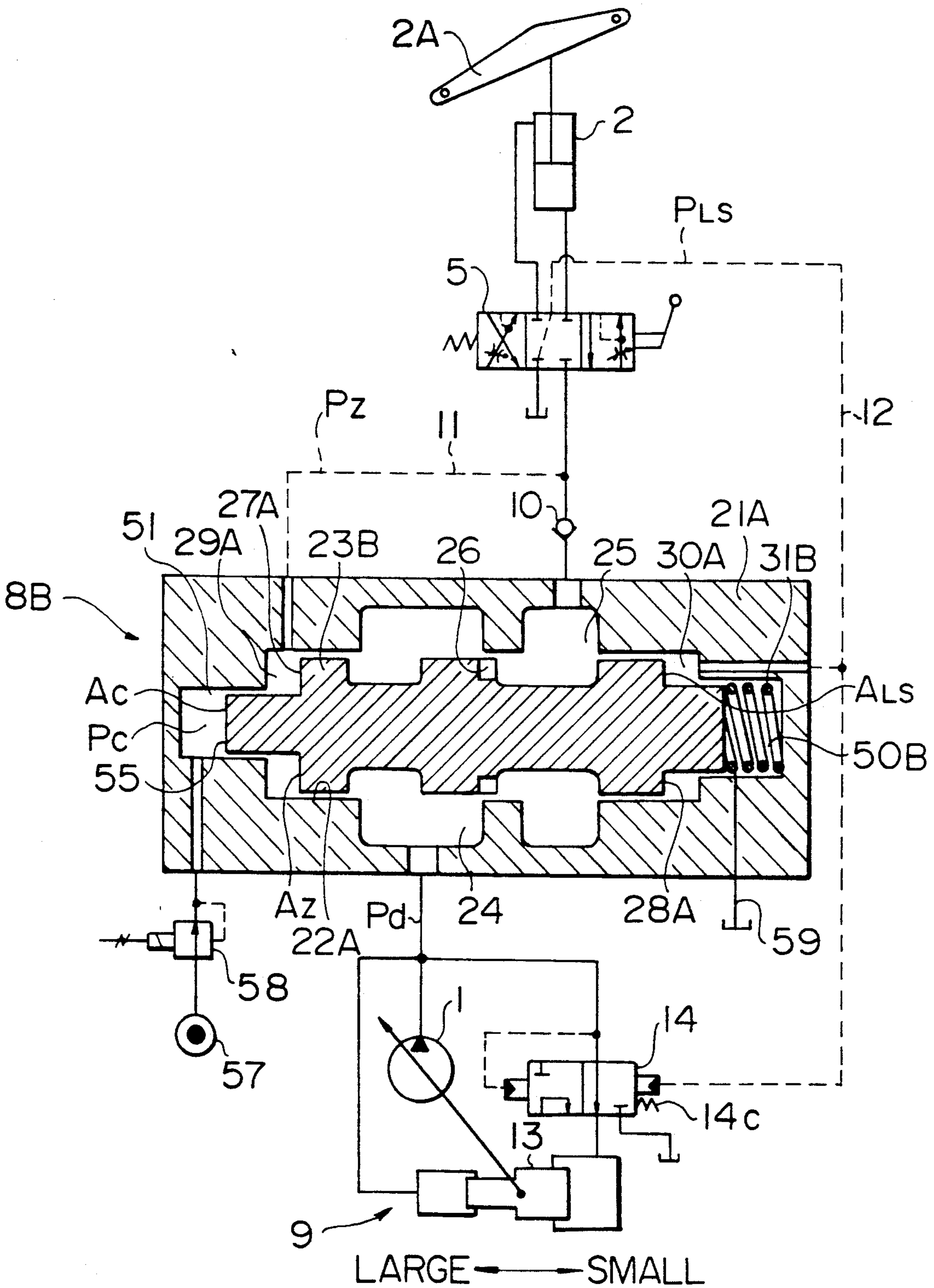
FIG. 5 is a schematic view of a hydraulic drive system according to a third embodiment of the present invention.

In FIG. 5, a pressure compensating valve 8B of this embodiment is constituted such that a spring 31B is disposed in a chamber 50B instead of the hydraulic source 56 in the second embodiment shown FIG. 4, and a resilient force f of the spring 31B is produced to act on the valve spool 23B in the valve-opening direction. The chamber 50 is connected to a drain circuit 59 in communication with a reservoir. The rest of the pressure compensating valve 8B is constituted in a like manner to that of the second embodiment.

In the third embodiment thus constituted, the following equation holds from a balance of the respective forces acting on the valve spool 23B:

$$Az\ Pz + Ac\ Pc = ALS\ PLS + f \quad (13)$$

This equation (13) can be rewritten to:

$$Az\ Pz = ALS\ PLS + (f - Ac\ Pc) \quad (14)$$

Here, the term f−AcPc in the equation (14) represents a force acting to urge the valve spool 23B in the valve-opening direction and corresponds to the initial load f of the spring 31 in the first embodiment. Therefore, the equation (14) is likewise equivalent to the equation (7) mentioned above. As a result, the third embodiment also meets the relationship of $\{dQi(P)/dP\}<0$ and can provide the similar advantageous effect to that in the foregoing first embodiment.

INDUSTRIAL APPLICABILITY

According to the present invention, since the relationship of $\{dQi(P)/dP\}<0$ is met, an actuator can be provided with a damping capability. It is thus possible to obtain high control accuracy of the actuator, achieve a superior following characteristic in operation by an operator, and ensure superior operability without letting the operator feel fatigued.

What is claimed is:

1. A hydraulic drive system for a civil engineering and construction machine comprising a hydraulic pump, an actuator driven by a hydraulic fluid delivered from said hydraulic pump, a flow control valve disposed between said hydraulic pump and said actuator, a pressure compensating valve having a valve spool for controlling a differential pressure (Pz−PLS) across said flow control valve, and pump delivery rate control means for controlling a flow rate of the hydraulic fluid delivered from said hydraulic pump dependent on a differential pressure (Pd−PLS) between a pump pressure and a load pressure of said actuator, said pressure compensating valve including a first control chamber subjected to load pressure (PLS) of said actuator for making the load pressure act on a first pressure receiving section of said valve spool to urge said valve spool in the valve-opening direction, a second control chamber subjected to the inlet pressure (Pz) of said flow control valve for making the inlet pressure act on a second pressure receiving section of said valve spool to urge said valve spool in the valve-closing direction, and target differential pressure setting means for urging said valve spool in the valve-opening direction for setting a target value of the differential pressure across said flow control valve, wherein:

a pressure receiving area (Az) of said second pressure receiving section is set to be greater than a pressure receiving area (ALS) of said first pressure receiving section.

2. A hydraulic drive system for a civil engineering and construction machine according to claim 1, wherein said target differential pressure setting means is a spring.

3. A hydraulic drive system for a civil engineering and construction machine according to claim 1, wherein said target differential pressure setting means includes means for hydraulically urging said valve spool.

4. A hydraulic drive system for a civil engineering and construction machine according to claim 3, wherein said means for hydraulically urging said valve spool includes means for generating a constant hydraulic pressure, a third control chamber subjected to the constant hydraulic pressure for urging said valve spool in the valve-opening direction, means for generating a variable hydraulic pressure, and a fourth control chamber subjected to the variable hydraulic pressure for urging said valve spool in the valve-closing direction.

5. A hydraulic drive system for a civil engineering and construction machine according to claim 3, wherein said target differential pressure setting means further includes a spring for urging said valve spool in the valve-opening direction, and said means for hydraulically urging said valve spool includes means for generating a variable hydraulic pressure, and a fifth control chamber subjected to the variable hydraulic pressure for urging said valve spool in the valve-closing direction.

6. A pressure compensating valve for controlling a differential pressure across a flow control valve disposed in a hydraulic circuit between a hydraulic pump and an actuator, the pressure compensating valve comprising: a valve housing having an inlet recess for connection to a hydraulic pump, an outlet recess connected to said flow control valve and a spool bore, a valve spool slidably fitted in said spool bore to control fluid communication between said inlet recess and said outlet recess, a first control chamber formed in said valve housing for receiving a load pressure of an actuator, a first pressure receiving section disposed in said first control chamber to urge said valve spool in a valve-opening direction, a second control chamber formed in said valve spool for receiving an inlet pressure of said flow control valve, a second pressure receiving section disposed in said second control chamber to urge said valve spool in a valve-closing direction, and target differential pressure setting means for urging said valve spool in the valve-opening direction for setting a target value of the differential pressure across said flow control valve, wherein:

a pressure receiving area (Az) of said second pressure receiving section is set to be greater than a pressure receiving area (ALS) of said first pressure receiving section.

* * * * *